Patented July 16, 1940

2,207,719

UNITED STATES PATENT OFFICE 2,207,719

ALKYL PHENOL DISULPHIDES AND MONO-SULPHIDES

Charles A. Cohen, Elizabeth, and Louis A. Mikeska, Westfield, N. J., assignors to Standard Oil Development Company, a corporation of Delaware No Drawing. Application December 4, 1937, Serial No. 178,140

11 Claims. (Cl. 260—608)

This invention relates to an improved process for the preparation of phenol sulphides. The invention particularly relates to the preparation of such sulphides by reaction of a phenol, sulphur and an alkali or alkaline carbonate in the presence of an inert solvent. The process of the present invention especially is concerned with the preparation of alkyl phenol sulphides by this reaction in which the metallic salt of a phenol sulphide is formed. This salt is then converted to the free phenol sulphide by treating with acid and purifying or by other methods known in the art.

The process of the present invention may be respresented by the following equation which is indicative of the reaction which occurs:

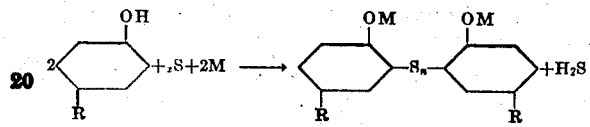

R represents an alkyl group, preferably having from 2 to 8 carbon atoms or may represent hydrogen, M represents an alkali metal which may be contained in an alkali or alkaline carbonate, and $n$ and $x$ represent integers from 1 to 4. The aromatic ring may contain more than one R group and more than one hydroxy group. The dimetallic salt of the phenol sulphide secured by the above reaction may then be converted to the free phenol as, for example, by treatment with acid, then separated and purified by any of the well-known methods.

Suitable initial materials for the present process may be any phenol as, for example, mono hydroxy phenol, resorcinol or pyrogallol. The preferred materials, however, are the alkyl mono hydroxy phenols, especially those alkyl mono hydroxy phenols containing from 1 to 8 carbon atoms in the alkyl group as, for example, cresol, ethyl phenol, propyl phenol, butyl phenol, amyl phenol, hexyl phenol, heptyl phenol and diisobutyl phenol. Materials especially preferred are the alkyl mono hydroxy phenols containing from 4 to 8 carbon atoms in the alkyl group as, for example, tertiary butyl phenol, tertiary amyl phenol, hexyl phenol and diisobutyl phenol.

The sulphur used in the reaction is preferably flowers of sulphur, although other forms or crude sulphur may be also utilized.

Any alkali metal as, for example, sodium, potassium, lithium, rubidium, caesium, or mixtures of these metals, may be employed. The alkaline carbonates and hydroxides are desirable as, for example, sodium hydroxide and potassium hydroxide. The sulphides of these metals as, for example, sodium sulphide and potassium sulphide, are also satisfactory. It is preferred, however, to use sodium carbonate, potassium carbonate, and the like.

The reaction is conducted in the presence of suitable solvents, preferably in the absence of free water. Suitable solvents are any inert solvent having a boiling point above 130° C. or higher as, for example, xylol, saturated hydrocarbons or hydrogenated compounds, glycerine and ethylene glycol. The preferred solvents are glycol, xylol, and the like.

The reaction is conducted by using from 2 to 2½ mols of the phenol per 2 or 3 mols of sulphur and 2 mols of the alkali or 1 mol of the alkaline carbonate. It is preferred, however, to use molecular quantities of the respective feed materials, depending upon whether a mono or poly sulphide is desired. If the poly sulphide is desired, the molecular quality of the sulphur used is raised accordingly.

The reaction is preferably conducted at atmospheric pressure although somewhat higher or lower pressures may be employed. The temperature of the reaction is maintained in the range of from 100 to 200° C., preferably at a temperature of about 150° C. The mixture is preferably agitated by mechanical means until the reaction is substantially complete as evidenced by the cessation of the evolution of hydrogen sulphide. Upon completion of the reaction, the entire mixture may be neutralized in order to convert the metallic salt to the free phenol. The phenol sulphide may then be separated from the reaction mixture by suitable means as, for instance, with solvent extraction or by fractional distillation. The segregated phenol sulphide may be then further purified in any desirable manner as, for example, by percolation through clay, sodium carbonate, etc.

The following example is presented to illustrate the invention and is not intended to limit the same in any manner whatsoever:

Example 1

100 parts by weight of para-tertiary butyl phenol, 32 parts by weight of flowers of sulphur and 32 parts by weight of anhydrous sodium carbonate were mixed with 217 parts by weight of glycerol contained in a receptacle fitted with a reflux container and mechanical stirrer. This mixture was heated at atmospheric pressure at a temperature of 150° C. for approximately 48 hours. Copious evolution of hydrogen sulphide is noticed at the start with gradual diminution toward the end of the process. At the end of 48 hours, the entire reaction mixture was diluted with approximately 500 parts by weight of water. The diluted reaction mixture was then neutralized by adding dilute acid until an acid reaction to Congo red paper was obtained. This diluted reaction product was then extracted with approximately 500 parts by weight of ethyl ether. The ether extract was removed by decantation and was then washed with water to remove the entrained mineral acid. The ether extract was then dried by treating with sodium sulphate and the ether was then evaporated from the extract.

The residue after removal of the ether was distilled under vacuum of from 1 to 2 millimeters absolute pressure, giving the following fractions:

|  | Temperature, °C. | Parts by weight |
|---|---|---|
| Fraction I | 110-150 | 53.3 recovered butyl phenol. |
| Fraction II | 200-205 | 24.4 butyl phenol sulphide. |
| Fraction III | Residue | 13.0 |

Fraction II was then analyzed to determine the percent of combined sulphur. Based upon this determination, the analysis of fraction II was as follows:

Per cent
Mono sulphide_____ approximately__ 50
Disulphide _____do_____ 50

The invention may be varied within wide limits. The temperature and pressure may be adjusted to secure the optimum yield of the particular sulphide desired from any particular feed material or class of feed materials. The respective quantities of the feed materials may also be adjusted to secure optimum results. For example, when it is desired to secure sulphides other than mono sulphides, the quantity of sulphur is increased. It may also be desirable to adjust the operating conditions in order to prevent any breakdown of the reaction products.

The invenion is not to be limited by any theory or mode of operation but only by the following claims in which it is desired to claim all novelty in so far as the prior art permits.

We claim:

1. Improved process for the preparation of phenol sulphides, comprising reacting a phenol in the absence of free water with sulphur and an alkali metal to form a metallic salt of the phenol sulphides, then converting said salt to the free phenol.

2. Improved process for the preparation of alkyl phenol sulphides, comprising reacting an alkyl phenol in the absence of free water with sulphur and an alkali metal to form the metallic salt of the alkyl phenol sulphide, then converting said salt to the free phenol.

3. Process in accordance with claim 2 in which said alkyl phenol contains from 1 to 8 carbon atoms in the alkyl group.

4. Process in accordance with claim 2 in which said alkyl phenol is tertiary butyl phenol.

5. Process in accordance with claim 2 in which said alkyl phenol is tertiary amyl phenol.

6. Process in accordance with claim 2 in which said alkyl phenol is diisobutyl phenol.

7. Improved process for the preparation of alkyl phenol sulphide, comprising reacting an alkyl phenol in the absence of free water with sulphur and an alkali metal at a temperature in the range from 100 to 200 to form the metallic salt of the alkyl phenol sulphide, then converting said phenol to the free alkyl phenol.

8. Process in accordance with claim 7 in which said alkali metal is contained in the form of the carbonate.

9. Process in accordance with claim 7 in which said alkali metal is sodium contained in the form of a carbonate.

10. Improved process for the preparation of the alkali phenol sulphides comprising reacting an alkali phenol with sulphur and an alkali in the presence of an inert non-aqueous solvent at a temperature in the range of from 130° C. to 200° C. to form a metallic salt of the alkali phenol sulphide, then converting said salt to free phenol.

11. Process in accordance with claim 10 in which said solvent is glycerine.

CHARLES A. COHEN.
LOUIS A. MIKESKA.